United States Patent [19]

Ganske

[11] 3,741,497

[45] June 26, 1973

[54] TAKE-UP HUB AND TAPE COMBINATION FOR TAPE TRANSPORT

[75] Inventor: Kingston E. Ganske, Rough and Ready, Calif.

[73] Assignee: Arvin Industries, Inc., Columbus, Ind.

[22] Filed: Jan. 25, 1972

[21] Appl. No.: 220,628

[52] U.S. Cl. .................. 242/192, 226/184, 242/195

[51] Int. Cl. .................. G03b 1/04, G11b 15/32

[58] Field of Search .................. 242/192, 195, 206, 242/210, 76; 226/181–184, 190

[56] References Cited

UNITED STATES PATENTS

| | | | |
|---|---|---|---|
| 2,546,146 | 3/1951 | Popoli | 242/71.8 |
| 2,946,530 | 7/1960 | Trimble | 242/71.8 |
| 3,547,372 | 12/1970 | Barnett | 242/192 |
| 3,552,681 | 1/1971 | Vogel et al. | 242/192 |

*Primary Examiner*—Leonard D. Christian
*Attorney*—Lawrence B. Biebel, Joseph G. Nauman et al.

[57] ABSTRACT

A take-up hub is biased against a rotatable capstan and has a beveled peripheral surface for receiving magnetic tape from a supply. The tape has a tapered end portion of a length equal to the mean circumference of the hub and the taper is formed so the first layer on the hub forms an underlayer which permits subsequent layers to be wound thereon without a bumping action.

7 Claims, 6 Drawing Figures

PATENTED JUN 26 1973 3,741,497

TAKE-UP HUB AND TAPE COMBINATION FOR TAPE TRANSPORT

BACKGROUND OF THE INVENTION

Take-up hubs used in tape transport systems, particularly transports for magnetic tape recording units, generally have a perfectly cylindrical peripheral surface. The tape is generally cut perpendicular to its length, attached to the hub, and transported from a reel supply by rotating a capstan to wind the tape on the peripheral surface of the hub.

In most tape transport systems the tape is made of Mylar which is a very incompressible material. Consequently, a bumping action occurs every time a layer of tape is wound over the butt end of the tape affixed to the hub surface. This bumping action continues to be noticeable after many layers have been wound on the hub, due to the incompressible nature of the Mylar tape.

The bump causes non-uniform tape motion, which results in time base errors in the signal recorded and/or reproduced by the magnetic transducer. This condition has been observed even after one hundred or more layers of tape are wound on the hub.

SUMMARY OF THE INVENTION

The present invention is directed to an improved take-up hub and tape assembly for use in tape transport handling systems. The invention essentially eliminates the bumping action created by the butt ends of tapes cut perpendicular to their length.

Generally, the invention provides for a take-up hub having a beveled peripheral surface and a tape having a longitudinally tapered end portion which cooperates with the beveled peripheral surface to define a first layer on the hub which eliminates the bumping effects of the butt ends and permits the tape hub to run in contact with a cylindrical capstan which will run smoothly since the combination of the conical hub and the tapered tape end will present no step diameter discontinuity to the capstan or take-up hub during tape winding.

In the preferred embodiment of the present invention, the take-up hub is generally cylindrical and has a beveled peripheral surface which gives the hub the shape of a section of a cone. The hub accordingly has a smaller diameter side and a larger diameter side, and the smaller diameter side has a radius which is less than the radius of the larger diameter side by the thickness of the tape to be wound thereon.

The tapered end portion of the tape is preferably cut from a point on the leading edge adjacent one side thereof rearwardly in a longitudinally diagonal direction to a point on the other side thereof and spaced from the leading edge. In the preferred embodiment, the tapered end portion has a longitudinal length equal to the mean circumference of the beveled hub.

The short leading edge of the tape is attached to the beveled surface adjacent the smaller diameter side of the hub and the taper forms a circumferential helix as the end portion is wound on the peripheral surface of the hub. The second layer of tape starts immediately above the leading edge of the tapered end portion which forms a first layer that substantially eliminates the bumping action created by the perpendicularly cut butt ends.

DESCRIPTION OF THE PREFERRED EMBODIMENT

Figure 1:
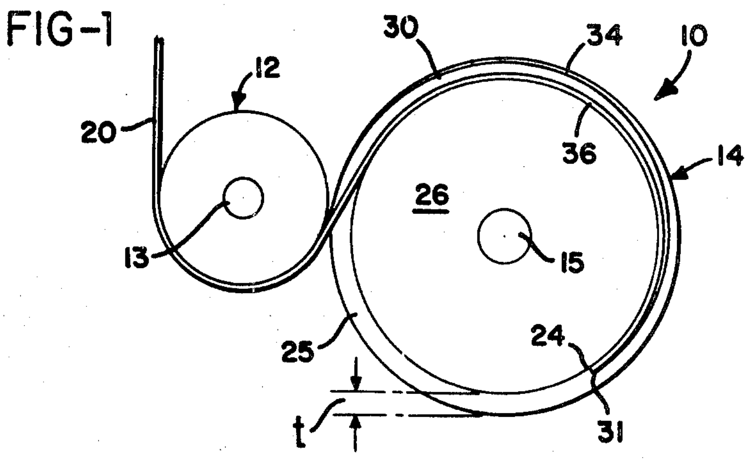
FIG. 1 is a side elevation of a capstan and take-up hub assembly and showing the tape affixed to the circumferentially beveled outer surface of the take-up hub and carried through a nip between the hub and the capstan.

The tape transport assembly 10 shown in FIG. 1 includes a capstan 12 which is rotatably mounted on a shaft 13 and a take-up hub 14 constructed according to the present invention and rotatably mounted on a shaft 15. The take-up hub 14 may be driven in a stationary position, with the capstan 12 biased against it, or vice versa. The latter mode of operation will be used to describe the invention.

The take-up hub 14 is mounted on suitable means (not shown) which enable it to move relative to the stationary capstan 12. A web of magnetic tape 20 is attached to the hub 14 at a predetermined point 24 and is wound on the hub from a supply reel (not shown) through a nip between the capstan and the hub. The take-up hub 14, being biased against the capstan 12 by means (not shown), is adapted to move relative to the capstan 12 as the number of layers of tape increases or decreases.

Figure 4:
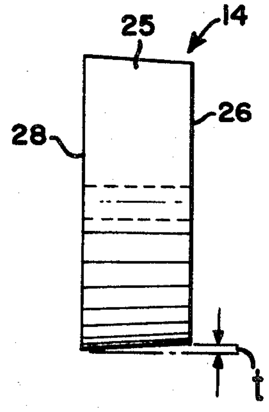
FIG. 4 is an end elevation of the take-up hub showing the circumferential taper (exaggerated)

In accordance with the present invention, the take-up hub 14 has a beveled peripheral surface 25 which gives the hub the configuration of a section of a cone (FIG. 4). The hub 14 accordingly has a smaller diameter side 26 and a larger diameter side 28. The radius of the smaller diameter side 26 is less than the radius of the larger diameter side 26 by a distance $t$, and this distance corresponds to the thickness of the tape 20. Stated in another way, the smaller diameter side 26 will have a diameter $d$ which is less than the diameter "D" of the larger diameter side 26 by two thicknesses of tape 20, or by 2t. In practice the tape 20 has a thickness on the order of 0.0015 inch and the larger diameter "D" of the hub 14 is about 2 inches. For simplicity, the beveled surface 25 has been exaggerated in the drawings to more clearly show the features of the invention.

The tape 20 has a tapered end portion 30 which is formed to cooperate with the beveled surface 25 to provide an underlayer which will allow subsequent layers to be wound on the hub 14 without a bumping action. In accordance with the preferred embodiment of the invention, the tapered end portion 30 is cut from a point 31 on one side of the tape rearwardly in a diagonal direction to a point 32 on the other side of the tape longitudinally spaced behind the point 31. The taper is preferably cut along a straight line and defines a tapered edge 34. The longitudinal length L of the tapered edge 34, as measured on the straight side 36, is preferably equal to the mean circumference of the take-up hub 14, as determined by the following calculation:

$$L = (\pi\ D + \pi\ d/2)$$
$$= [(\pi\ D + \pi\ \text{bevel, 2t})/2)]$$
$$= (\pi\ D + \pi\ D - 2\ \pi\ t/2)$$
$$= [2\ \pi\ (D-t)/2]$$
$$= \pi\ (D-t)$$

Figure 5:
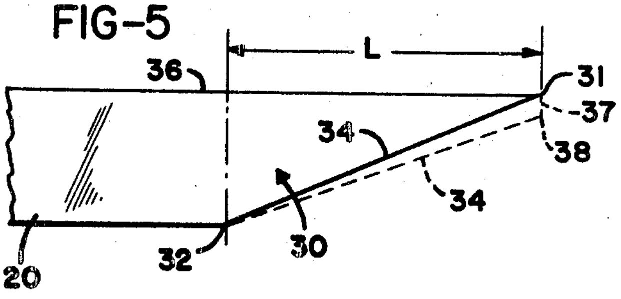
FIG. 5 is a top view of the tapered end portion of the tape.

While the tapered end portion 30 preferably has a taper cut along a straight line from point 31 to point 32, other taper forms are believed to be within the scope of the invention. For example, the tapered end portion 30 may be formed with a relatively short leading edge 37 and have a taper cut along a straight line from a point 38 spaced from point 31 to the point 32. A stepped taper form may also be used. The leading edge form is illustrated in FIG. 5 in dotted lines. To accommodate the leading edge form or the stepped form of the invention, the circumferential step and 25 of the hub could be formed with a circumferential step and a helical bevel, or simple with a stepped taper. These alternate forms are not preferred because they are difficult to machine accurately. The straight side-to-side taper and simple bevel are preferred.

Figure 2:
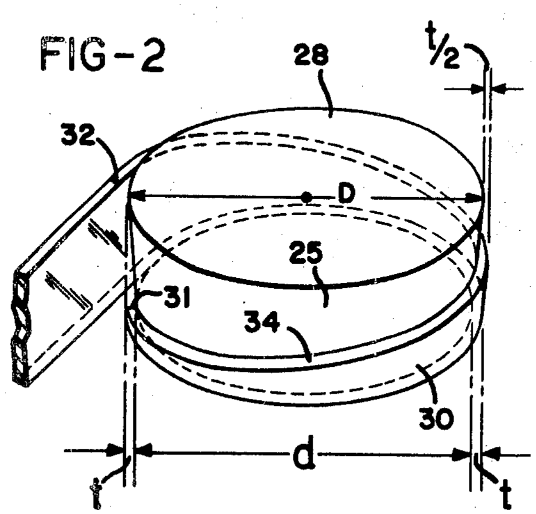
FIG. 2 is a perspective view of the hub showing the tapered end portion of the tape completely wound on the beveled surface of the hub.

In operation the tape 20 is wound on the hub with its straight side 36 aligned with the smaller diameter side 26 of the hub. Referring to FIGS. 1–3 and 6, the tape 20 is attached at point 31 to the surface 25 by well known means, such as by adhesives or by mechanical slips or the like, at any designated point 24 therealong. As the tape 20 is wound around the surface 25, the tapered edge 34 forms a circumferential helix from point 31 to point 32. As shown in FIG. 2, after the tapered end portion 30 has been wound to form a complete convolution, point 32 sill be transversely aligned above point 31. This is shown clearly in FIG. 3 where point 32 will be positioned directly above the point 31 after it is wrapped around the hub 14 and over the tapered end portion 30. Thus, the tapered end portion 30, having a length L equal to the mean circumference of the hub, forms forms the first layer on the hub 14 which defines a smooth underlayer for subsequent layers.

Figure 6:
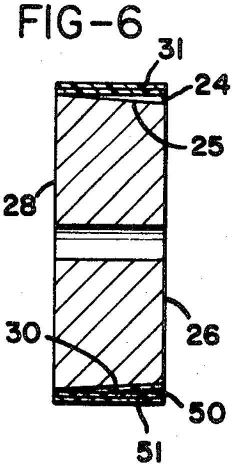
FIG. 6 is a sectional view of the take-up hub showing several layers of tape wound on the hub to show the effect of the tapered end portion and the cooperating beveled peripheral surface.
Figure 3:
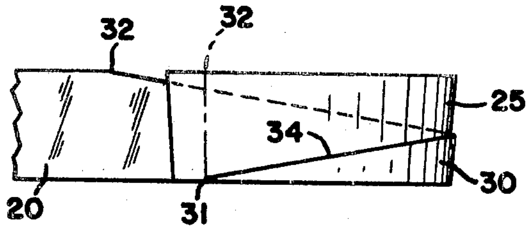
FIG. 3 is an end view of the hub showing the tapered end portion of the tape partially wound on the beveled surface of the hub.

FIG. 6 is a sectional view of the hub taken at point 24 and showing the exaggerated bevel in the surface 25. Full layers of tape 50 nd 51 have been wound on the underlayer comprising the tapered end portion 30. The effect of the underlayer is necessarily relatively diagrammatic, due to the exaggerated sizing. But, the effect of the invention, as shown, is that the tapered portion 30 defines a smooth helical underlayer which essentially offsets the bevel in surface 25, with the desirable result that the layers 50 and 51 lie flat and there is no bump in the area of point 31. As such, the present invention provides new and improved results which advance the art.

From the foregoing description and accompanying drawings, it is apparent that the tape transport assembly in accordance with the present invention provides desirable features and advantages. The tapered end portion of the tape cooperates with the beveled peripheral surface of the hub to eliminate the bumping action which occurs where the tape is wound over a perpendicular cut butt end affixed to the hub. By eliminating the bumping action, the invention substantially eliminates wear on the shafts of the capstan and take-u hub caused by vibrations and the like. Moreover the tape winds on the hub without a noticeable bump and the invention substantially eliminates the danger that the tape will be jarred by the bumping action into winding on the hub out of alignment. Thus, the present invention provides new and improved results which advance the art of tape transport systems.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Tape winding apparatus comprising a take-up hub, a tape means defining a beveled peripheral surface on said hub for receiving the tape, and means defining a tapered end portion on said tape formed to offset the bevel in said hub and to define a first layer on said hub for permitting subsequent layers to be wound thereon without a bumping action.

2. The tape winding apparatus of claim 1 wherein said take-up hub is cylindrical and has a smaller diameter side and a larger diameter side, and the smaller diameter side has a radius which is less than the radius of the larger diameter side by the thickness of said tape.

3. The tape winding apparatus of claim 1 wherein the tapered end portion has a straight side and a tapered side, and the tapered side includes a taper cut from a leading point on said straight side rearwardly in the diagonal direction to a point on said tapered side spaced a predetermined longitudinal distance from said leading point.

4. The tape winding apparatus of claim 3 wherein said predetermined longitudinal distance is equal to the mean circumference to said hub.

5. The tape winding apparatus of claim 3 wherein said straight side of said tapered end portion is aligned with the smaller diameter side smaller diameter said hub, and said tapered side of said tapered end portion forms a circumferential helix as said tapered end portion is wound about said hub to form said first layer.

6. In winding apparatus in which a tape is delivered around a capstan to a nip formed with a generally cylindrical take-up hub, and wherein the capstan and the hub are adapted for relative movement as the windings increase the effective diameter of the hub, the improvement comprising: mean forming a longitudinal taper in an end portion of said tape, and mean forming a circumferential bevel on the peripheral surface of said hub for receiving said end portion as the first convolution thereon and for cooperating with said taper to define a smooth underlayer for receiving subsequent layers of tape thereon without creating a bumping action.

7. In a tape handling system including a tape and a cylindrical capstan for receiving the leading edge of the tape from a supply, a cylindrical take-up hub for receiving the tape from said capstan, and mean adapting the capstan and the hub for relative movement as the wound layers of tape increase the effective diameter of the hub, the improvement comprising:

means on said hub forming a beveled peripheral surface giving said hub the configuration of a section of a cone, said hub having a smaller diameter side and a larger diameter side, and said smaller diameter side having a radius which is less than the radius of the larger diameter side by the thickness of said tape; and means forming a taper in an end portion of said tape and defining a straight side and a tapered side on aid tape, said taper being cut in the diagonal direction from a leading point on the straight side of said tape to a point longitudinally spaced behind said leading point on the tapered side of said tape, the length of said tapered end portion being equal to the circumference to said hub whereby the first layer of tape forms a smooth underlayer for receiving subsequent layers of tape thereon.

* * * * *

PO-1050
(5/69)

UNITED STATES PATENT OFFICE
CERTIFICATE OF CORRECTION

Patent No. 3,741,497 Dated June 26, 1973

Inventor(s) Kingston E. Ganske

It is certified that error appears in the above-identified patent and that said Letters Patent are hereby corrected as shown below:

Column 2, line 49, "diameter side 26" should be --28--;
line 53, "side 26" should be --side 28--.

Column 3, line 8, the first four (4) equations are wrong and should read:

$$L = [\pi D + \pi d]/2$$
$$= [\pi D + \pi (D-2t)]/2$$
$$= [\pi D + \pi D-2 \pi t]/2$$
$$= [2 \pi (D-t)]/2$$

line 26, "simple" should be --simply--;
line 39, "sill" should be --will--;
line 46, "form" (second occurrence) should be deleted.

Column 4, line 2, "take-u" should be --take-up--;
line 42, "smaller diameter side smaller diameter said hub," should read --smaller diameter side of said hub,--;
line 51, "mean" should be --means--;
line 61, "mean" should be --means--.

Column 5, line 6, "aid" should be --said--.

Column 6, line 4, before "circumference" insert --mean--;
same line, "to" should be --of--.

Signed and sealed this 27th day of November 1973.

(SEAL)
Attest:

EDWARD M.FLETCHER,JR.
Attesting Officer

RENE D. TEGTMEYER
Acting Commissioner of Patent